(12) United States Patent
Dally

(10) Patent No.: US 9,069,664 B2
(45) Date of Patent: Jun. 30, 2015

(54) UNIFIED STREAMING MULTIPROCESSOR MEMORY

(75) Inventor: William James Dally, Stanford, CA (US)

(73) Assignee: NVIDIA Corporation, Santa Clara, CA (US)

( * ) Notice: Subject to any disclaimer, the term of this patent is extended or adjusted under 35 U.S.C. 154(b) by 877 days.

(21) Appl. No.: 13/240,366

(22) Filed: Sep. 22, 2011

(65) Prior Publication Data

US 2012/0079200 A1   Mar. 29, 2012

Related U.S. Application Data

(60) Provisional application No. 61/386,244, filed on Sep. 24, 2010.

(51) Int. Cl.
    G06F 13/00    (2006.01)
    G06F 12/06    (2006.01)
    G06F 13/16    (2006.01)

(52) U.S. Cl.
    CPC .............. *G06F 12/06* (2013.01); *G06F 13/16* (2013.01); *G06F 2213/0038* (2013.01)

(58) Field of Classification Search
    CPC ................................. G06F 13/16; G06F 12/06
    USPC .......................................... 711/201, E12.002
    See application file for complete search history.

(56) References Cited

U.S. PATENT DOCUMENTS

2010/0246819 A1*  9/2010  Candelore .................... 380/210
2012/0084512 A1*  4/2012  Oberlaender ................. 711/128

* cited by examiner

*Primary Examiner* — Edward Dudek, Jr.
(74) *Attorney, Agent, or Firm* — Zilka-Kotab, PC

(57) ABSTRACT

One embodiment of the present invention sets forth a technique for providing a unified memory for access by execution threads in a processing system. Several logically separate memories are combined into a single unified memory that includes a single set of shared memory banks, an allocation of space in each bank across the logical memories, a mapping rule that maps the address space of each logical memory to its partition of the shared physical memory, a circuitry including switches and multiplexers that supports the mapping, and an arbitration scheme that allocates access to the banks.

18 Claims, 10 Drawing Sheets

UNIFIED STREAMING MULTIPROCESSOR MEMORY

CROSS-REFERENCE TO RELATED APPLICATIONS

This application claims priority benefit to U.S. provisional patent application titled, "Multi-Stranding," filed on Sep. 24, 2010 and having Ser. No. 61/386,244. This related application is also hereby incorporated by reference in its entirety.

BACKGROUND OF THE INVENTION

1. Field of the Invention

The present invention generally relates to program execution and more specifically to a unified stream multiprocessor memory.

2. Description of the Related Art

Conventional graphics processing units (GPUs) use a large number of hardware execution threads to hide both function unit pipeline latency and memory access latency. Local memories that hold operands and provide operand bandwidth are a major consumer of area and power in modern processors of all kinds. Typically separate memories are used to hold registers, cached data, explicitly local data, constants, and the like. Providing separate memories separates functionality but increases overhead and decreases utilization of both capacity and bandwidth because unused capacity or bandwidth from one memory cannot be used for the other classes of data.

Accordingly, what is needed in the art is an improved system and method for providing storage for the execution threads.

SUMMARY OF THE INVENTION

One embodiment of the present invention sets forth a technique for providing a unified streaming multiprocessor memory for access by execution threads. Several logically separate memories are combined into a single unified memory that includes a single set of shared memory banks, an allocation of space in each bank across the logical memories, a mapping rule that maps the address space of each logical memory to its partition of the shared physical memory, a circuitry including switches and multiplexers that supports the mapping, and an arbitration scheme that allocates access to the banks.

Various embodiments of a method of the invention for accessing a unified memory include arbitrating access requests for the unified memory, where the unified memory is configured for aligned access requests and unaligned access requests. Data from different banks of the unified memory is multiplexed to process the aligned access requests and data from different banks of the unified memory is switched to process the unaligned access requests.

A smaller total number of banks may be used in the unified memory compared with the logical memories, resulting in a higher efficiency in terms of memory utilization and access. Memory capacity can be dynamically allocated from one purpose to another, where each purpose corresponds to one of the logical memories. For example, memory capacity may be dynamically reallocated from registers to shared memory. Also memory bandwidth can be dynamically allocated across the logical memories.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
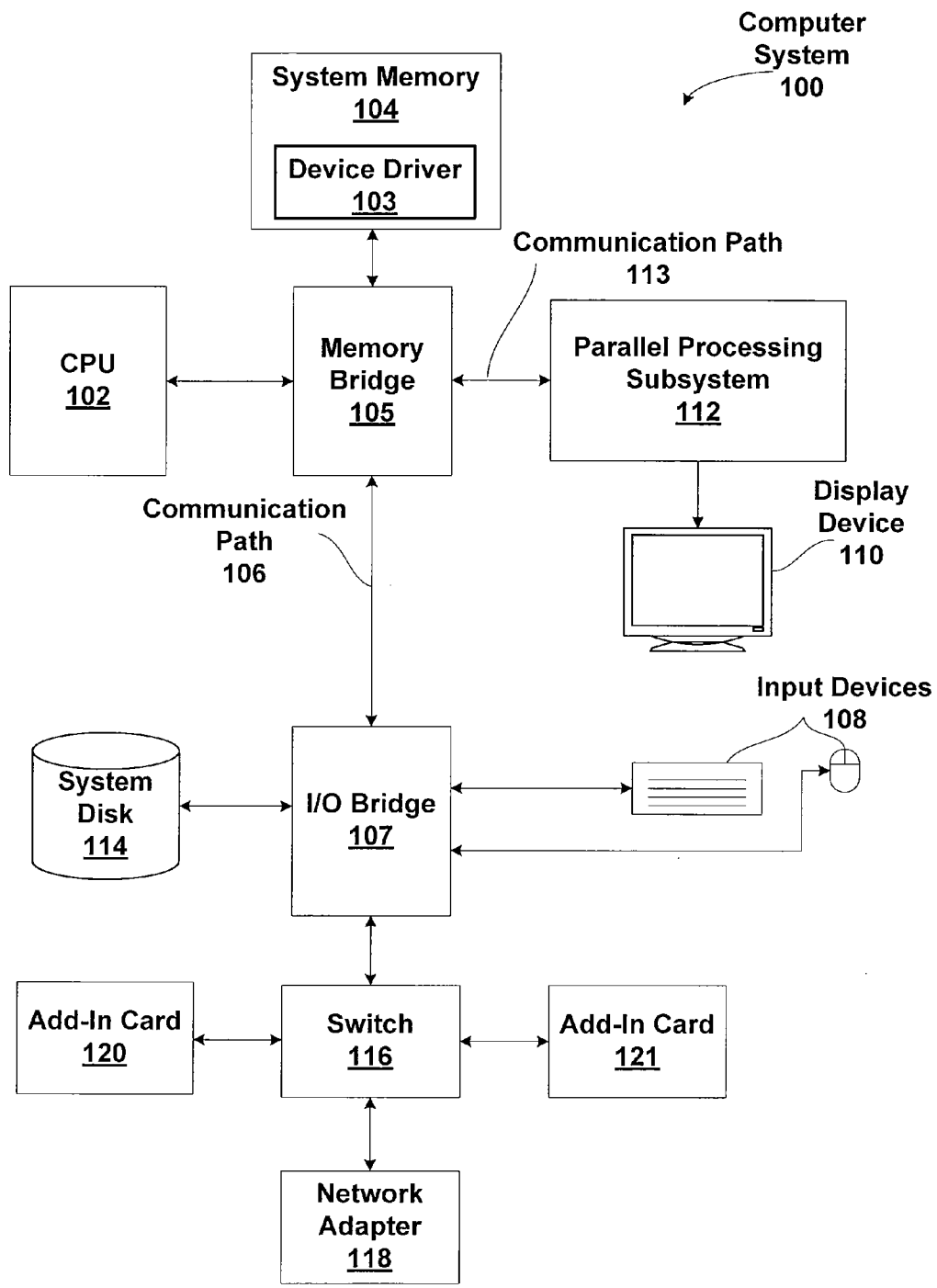
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
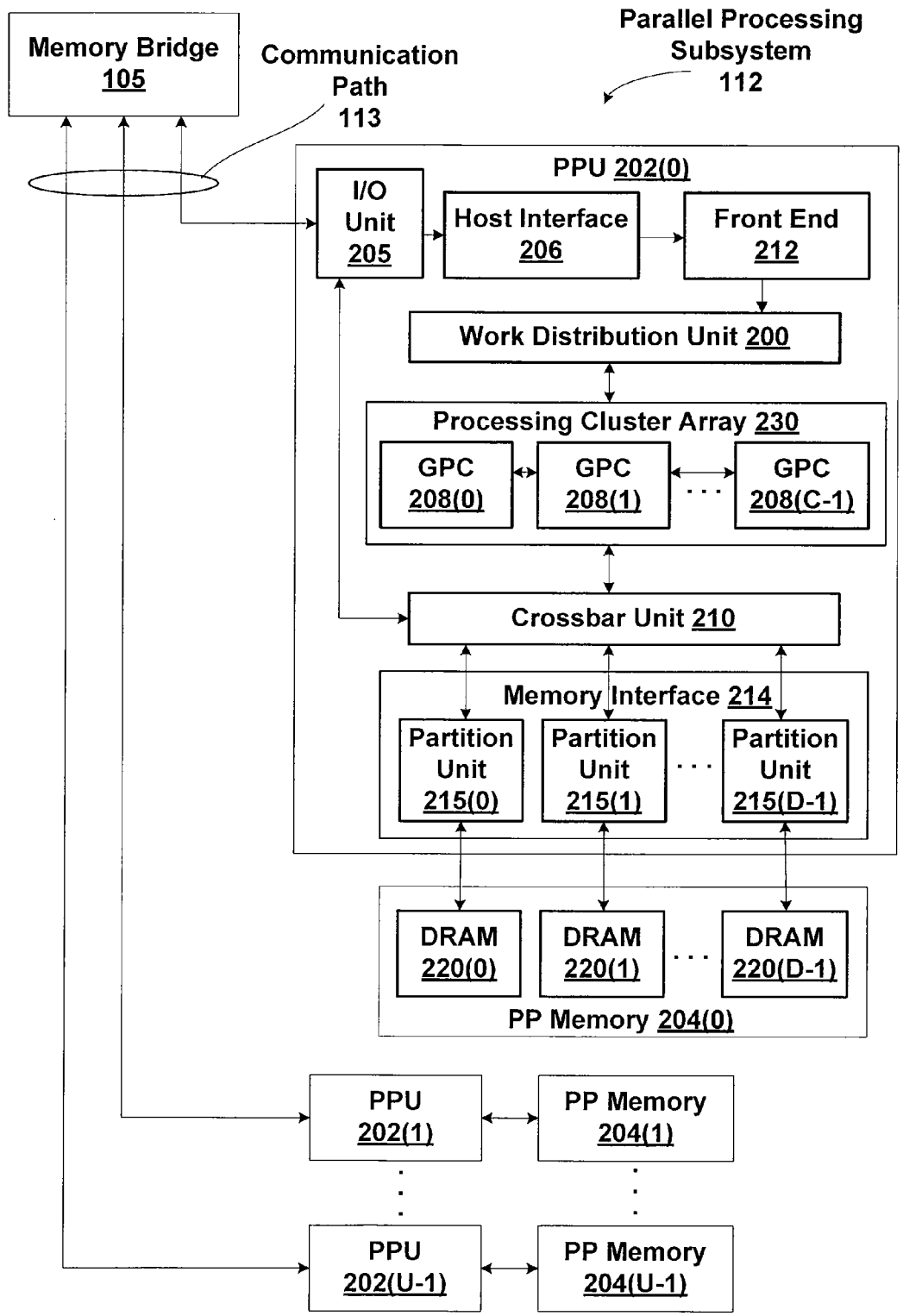
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
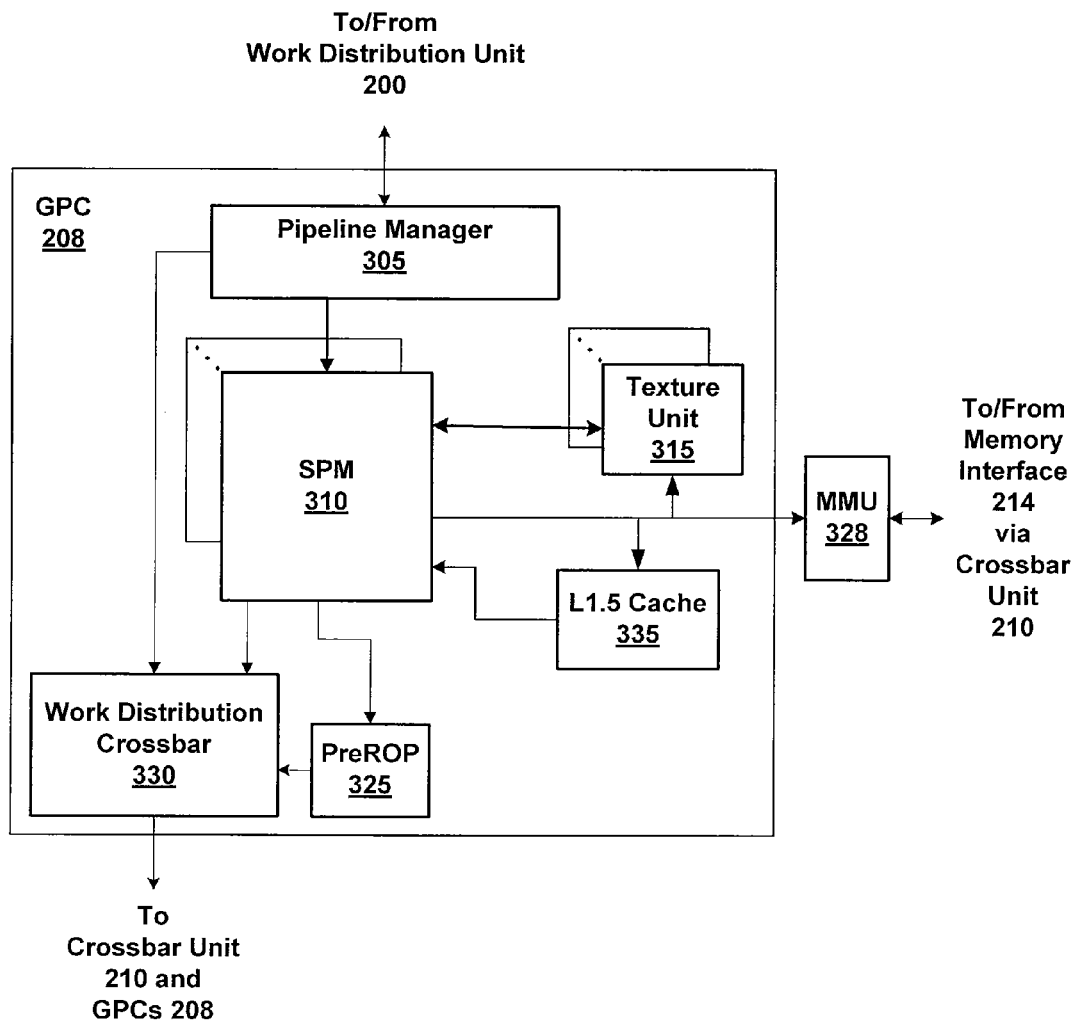
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units—shown as Exec units 302 and LSUs 303 in FIG. 3C) that may be pipelined, allowing a new instruction to be issued before a previous instruction has finished. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
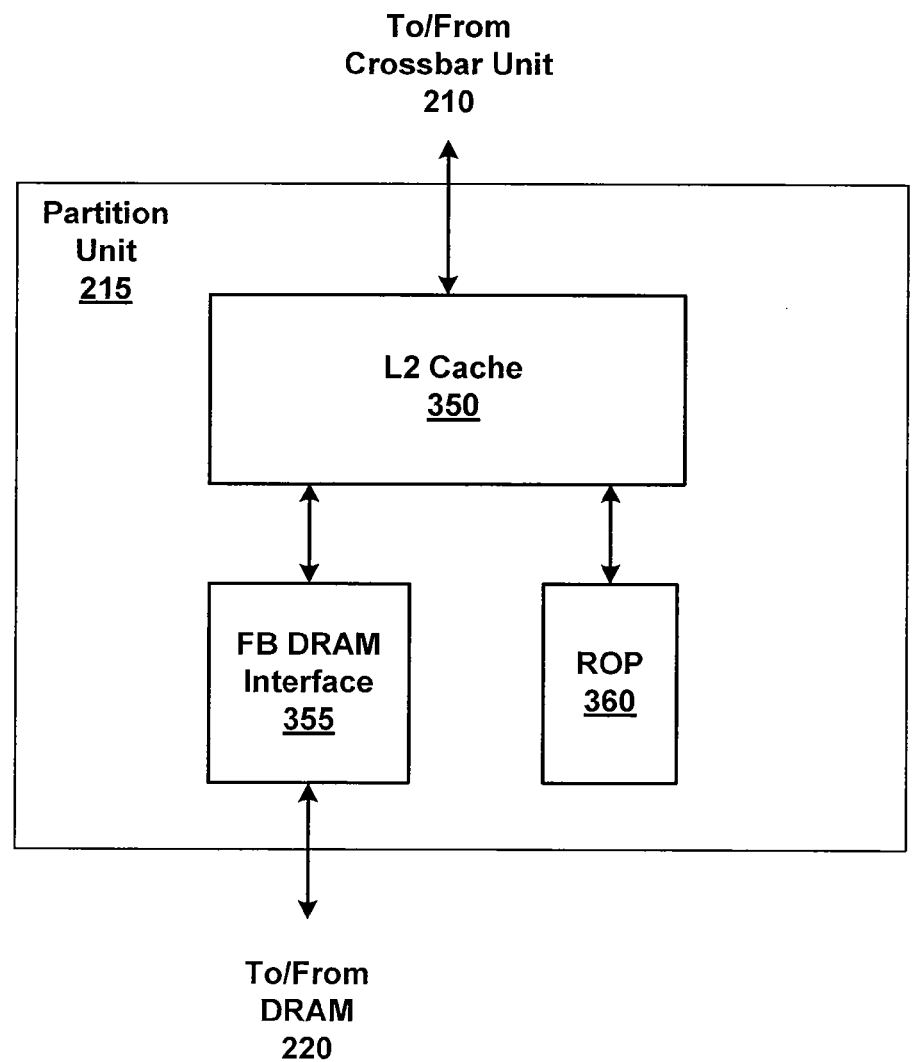
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
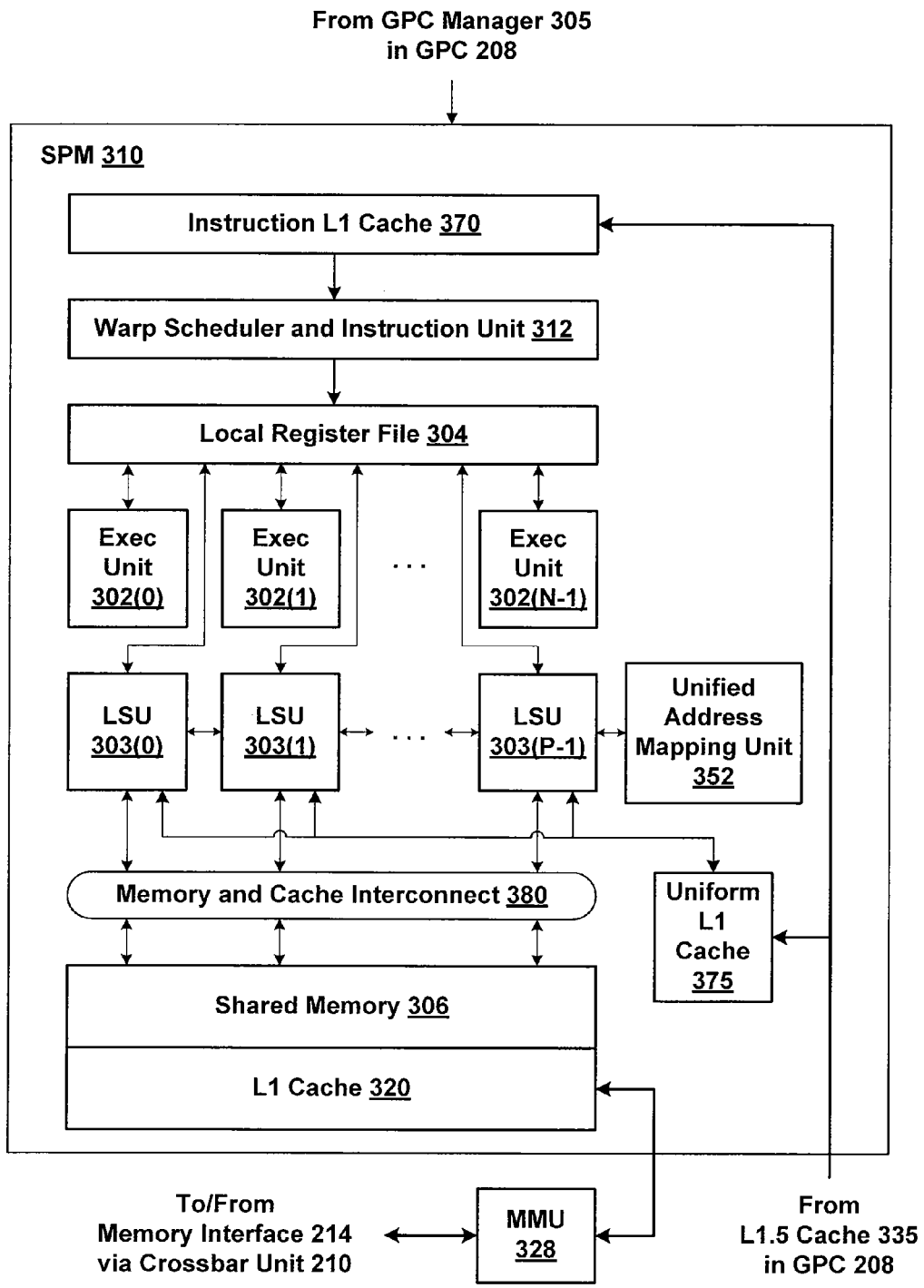
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a logical memory included within a unified memory or a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to all CTA threads (within a single CTA); any location in shared memory 306 is accessible to any CTA thread within the same CTA (or to any processing engine within SPM 310). Shared memory 306 can be implemented as a logical memory within a unified memory, shared register file, or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

A Unified Memory

Shaders programs executing on the SPM 310 are broken into strands—code segments that have predictable timing. Of the G*M thread groups active in an SPM 310 at a given time, only a subset of these thread groups are active running strands. These strands run to completion without waiting on any long- or variable-latency operation (e.g., a Load from PP memory 204 or system memory 104 or a cache miss for the L1 cache 320 or uniform L1 cache 375). When a strand terminates, the thread group that was executing the strand cannot start execution of another strand until all outstanding loads complete. While running, a strand can read operands from either the local register file 304 or operand registers (not shown) and can write results to either the local register file 304 or the operand registers. When a strand terminates, all of the state associated with the strand must be in the local register file 304 because the operand registers may be reallocated to another strand. All loads (and other long or variable latency operations) must target locations in the local register file 304.

All instructions for a strand must be present in the instruction L1 cache 370 before a strand is eligible to issue for execution by the exe units 302. Requiring all of the instructions to be present before a strand issues prevents idling on a long-latency instruction cache miss. A maximum length limit may be placed on strands, i.e., strands can contain at most k instructions. The length limit does not limit how long strands can run—since a strand is allowed to branch within these k instructions. Because strands only have to hide the short latency of arithmetic units, only a small number of active strands (e.g., 4 or more) should be required to keep the exec units 302 busy. In contrast, a much larger number of thread groups (e.g., 48 or more) are needed to hide memory latency. Having a small number of active strands permits a small, low-power, register file to be used to store the active strands and capture most of the operand bandwidth. Because strands are statically scheduled, no run-time instruction scheduling hardware is required.

An active strand may be deactivated when a long latency memory access occurs. An eligible strand is activated and may execute while the memory access for the deactivated strand completes. Accesses to global memory, e.g., memory 204 or system memory 104, are typically long latency events that cause an active strand to be deactivated. While shared memory 306 access latencies are not completely predictable due to potential bank conflicts, the latency is low enough that shared memory 306 accesses should not cause a strand to be deactivated. Similarly, accesses to the local register file 304 are low latency and do not cause a strand to be deactivated. Accesses to the uniform L1 cache 375 and the L1 cache 320 are low latency when a cache hit occurs. Consequently, when a cache miss occurs for an access of the uniform L1 cache or the L1 cache 320 the strand is deactivated.

Within a strand, all scheduling is performed statically by a compiler. The compiler assigns operations to functional units, e.g., add, reciprocal, subtract, multiply, and the like, within the exec units 302 and assigns live variables to registers (in the operand register file and local register file 304) over the lifetime of the respective live variable. The compiler encodes the static schedule by annotating each instruction with the count of cycles that must elapse before the next instruction from the same strand is issued. Each cycle that an instruction issues, the strand's cycle counter (CC) is set to the count of cycles value specified by the issued instruction. The cycle counter for the strand is decremented each cycle during which the strand does not issue an instruction. When the cycle counter reaches zero, the strand is "enabled" and may issue another instruction. The strand remains active while the cycle counter decrements and only active strands may be enabled. Each cycle, the warp scheduler and instruction unit 312 selects an enabled strand and the next instruction for the selected strand is issued to an exec unit 302 or LSU 303.

Following execution of an instruction, contention for a write port to an operand register or the local register file 304 can potentially delay the writeback of a result by a cycle or two. The writeback operations cannot be statically scheduled because with variable function unit latency, a writeback from one strand may collide with a writeback from a different strand, having a different latency. When a strand's writeback is delayed due to port contention during writeback, the delayed strand's cycle counter is inhibited from decrementing that cycle, and if the cycle counter is zero, the strand is inhibited from being selected. Also a skid buffer is included to temporarily store the data for writeback when the contention is resolved.

The various logical memories that are accessed by the strands that may be combined into a single unified memory include: local register file 304, shared memory 306, uniform L1 cache 375, and L1 cache 320. Other logical memories that may be included (not shown) are an L0 cache, an L0 scratchpad, and other task or function specific memories.

Figure 4A:
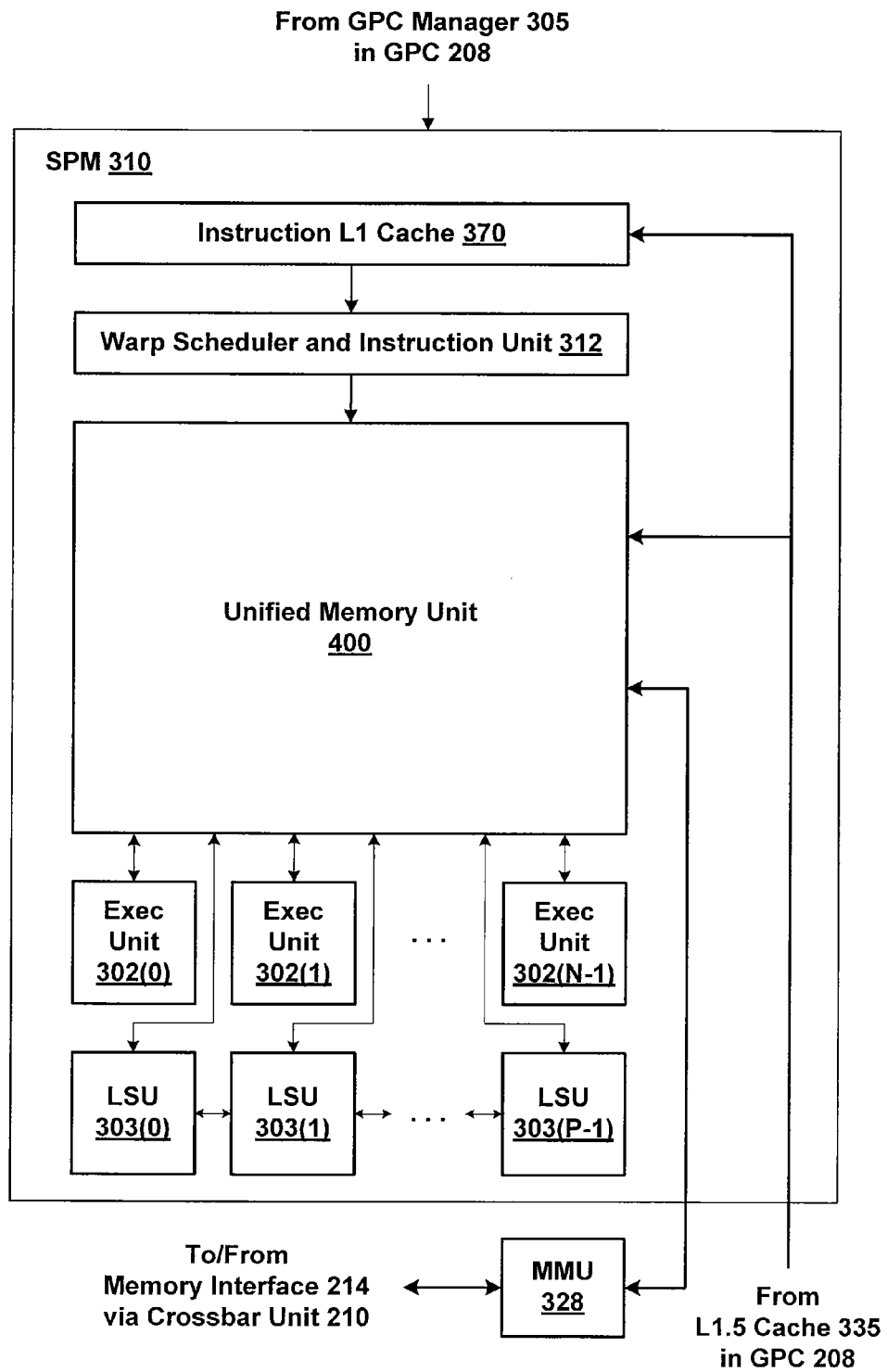
FIG. 4A is a block diagram of portions of a SPM 310 of FIG. 3C, according to one embodiment of the present invention.

FIG. 4A is a block diagram of portions of a SPM 310 of FIG. 3C including a unified memory unit 400, according to one embodiment of the present invention. The unified memory unit 400 includes a single set of memory banks that implement the local register file 304, shared memory 306, uniform L1 cache 375, and L1 cache 320 shown in FIG. 3C. The unified memory unit 400 allows memory to be dynamically partitioned between the local register file 304, shared memory 306, uniform L1 cache 375, and L1 cache 320. The unified memory unit 400 also enables higher bandwidth aligned access to the shared memory 306, uniform L1 cache 375, and L1 cache 320. Access latencies may be reduced because the amount of memory available for one or more of the local register file 304, shared memory 306, uniform L1 cache 375, and L1 cache 320 can be dynamically adjusted.

The different logical memories embodied in the unified memory unit 400 are accessed in different manners, e.g., aligned or random. The local register file 304 is aligned with particular ports of the exec units 302, such that each bank of the single set of memory banks in the unified memory unit 400 is aligned with a respective port of each exec unit 302. Therefore, register allocation is restricted (and may require some register duplication) but, any switching on the read side of the exec units 302 is avoided. Each exec unit 302 may write any bank of the local register file 304 within the unified memory unit 400. In other words, datapaths are switched on the write path, but not the read path for the local register file 304. When functional units within the exec units 302 have three input ports and one output port, the number of switches is reduced by a factor of four when only aligned reads are supported compared to an embodiment requiring switches on both the read and write ports of the functional units.

When the local register file 304 reads are constrained to be aligned to the input ports of exec units 302, a number of move operations are required to position data in the bank of the unified memory unit 400 that is correctly aligned to a particular input port. A move unit may be provisioned in parallel with each exec unit 302 that passes an unused input to an extra output, thereby reading data from one bank and writing the data to another bank. For example, if a 3-input functional unit within the exec unit 302 is configured to perform a 2-input operation (e.g., addition or multiplication) the third input may be used to move a register to a different register bank of the local register file 304 embodied in the unified memory unit 400. Thus, moving registers to different banks may be performed without delaying operations specified by an instruction. In sum, a move operation may be executed concurrently with execution of an instruction when an input and an output port are unused. The move operation may be generated by the compiler.

In contrast with the local register file 304, the shared memory 306 and L1 cache 320 are accessed in an unaligned, i.e., random, manner for reads and writes. Therefore, a crossbar or switch is needed to direct the output of any bank of the unified memory unit 400 to any input port of the exec units 302 and to direct the output of the exec units 302 to any bank of the unified memory unit 400. However, in one embodiment, not all of the input and/or output ports of the exec units 302 require random access of the shared memory 306 and L1 cache 320. For example, random access may only be needed for a data return input of the exec units 302 while other inputs use aligned accesses.

Finally, the uniform L1 cache 375 is read using uniform reads. A uniform read distributes an output read from one bank to all of the exec units 302. Therefore, the different logical memories embodied by the unified memory unit 400 may be accessed in three different modes: aligned, random, and uniform. When the different logical memories are embodied in the unified memory unit 400, the different access modes are supported by multiplexers configured to direct the output of each bank to the respective input ports and to direct the output ports to each bank. Crossbar or switch circuitry is configured to direct any bank output to any input port and to direct any output port to any bank input to support random accesses.

Figure 4B:
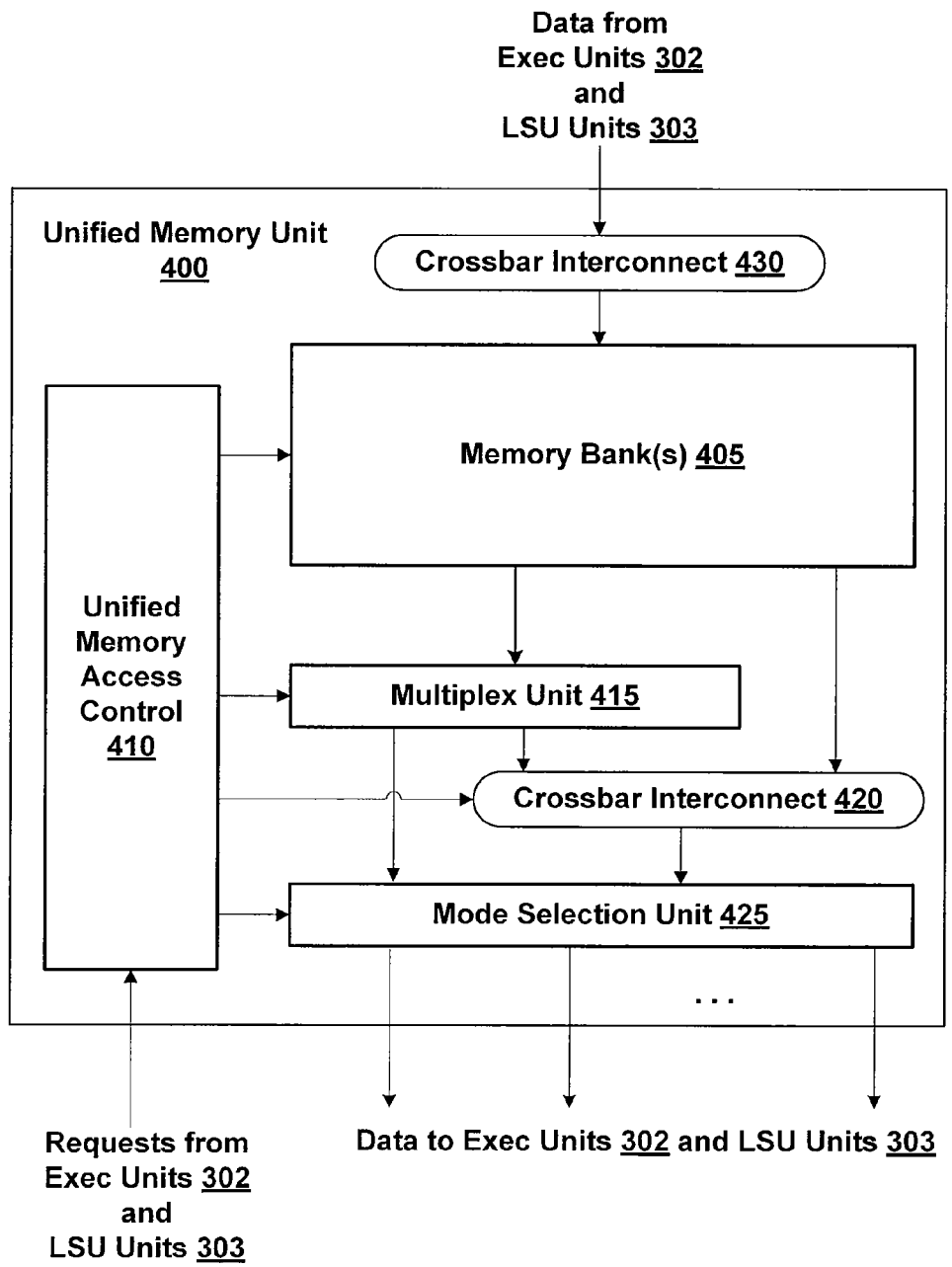
FIG. 4B is a block diagram of the unified memory unit of FIG. 4A, according to one embodiment of the present invention.

FIG. 4B is a block diagram of the unified memory unit 400 of FIG. 4A, according to one embodiment of the present invention. A unified memory access control 410 receives the address for each access (read or write) request and configures a multiplex unit 415, crossbar interconnect 420 and mode selection unit 425 to direct data for read requests and configures a crossbar interconnect 430 to direct data for write requests. When multiple requests are received to access the same bank of the memory bank(s) 405, the unified memory access control 410 arbitrates between the requests so that each port of a memory bank receives or outputs data for a single request each access cycle. The multiplex unit 415 is configured to direct the outputs of the memory bank(s) 405 for aligned accesses. The crossbar interconnect 420 is configured to direct the outputs of the memory bank(s) 405 for unaligned accesses. The mode selection unit 425 is configured to select between the aligned and unaligned data for each port of the exec units 302 and LSU units 303.

Figure 5A:
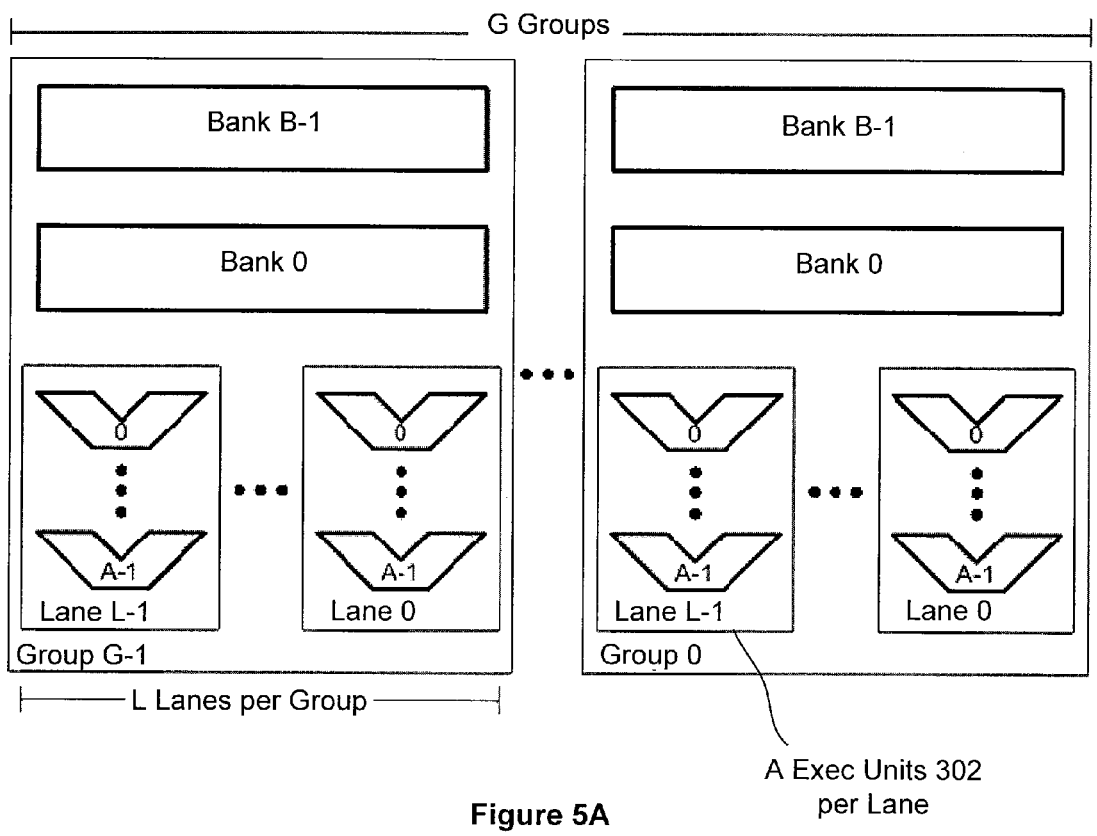
FIG. 5A is a conceptual diagram illustrating multiple memory banks of the unified memory unit and groups of exec units, according to one embodiment of the present invention.

FIG. 5A is a conceptual diagram illustrating multiple memory banks within the memory bank(s) 405 of the unified memory unit 400 and groups of exec units 302, according to one embodiment of the present invention. An SPM 310 is composed of LG lanes grouped into G groups of L lanes per group. Each lane has A exec units 302. Each group of lanes is associated with B L word wide by N word deep banks of memory in the memory bank(s) 405. The total number banks in memory bank(s) 405 is GB banks, resulting in GBNL words of memory.

Within the unified memory unit 400, each of G groups of L SPM lanes has B banks of memory, each of which reads up to L words in parallel. For example, in one embodiment, B=8 2 KB (128×128) banks. for each L=4 lanes. The size and number of banks in the unified memory unit 400 may be greater or smaller. The number of banks is usually a power of 2 to eliminate the need for a divide or modulo operation in the address calculation.

The storage capacity of the unified memory unit 400 can be flexibly partitioned between the various logical memories, e.g., local register file 304, shared memory 306, uniform L1 cache 375, and the L1 cache 320. Shared memory 306 can be allocated from one end of each memory bank and can be an arbitrary size. The L1 cache 320 can be allocated from the other end of each memory bank and should be a power of two in length to allow set-associative lookup. The local register file 304 and the uniform L1 cache 375 can use the area between the two allocations. The cache tag array for the L1 cache 320 must be allocated large enough to handle the largest configurable size of the L1 cache 320. For example, with G=8, L=4, B=4, and 8 KB (512×128) banks, one could allocate the top quarter (2 KB) of each of the 32 banks to the L1 cache 320. The bottom 93 rows of each bank could be allocated to the shared memory 306, and the remaining 291 rows can be allocated to registers of the local register file 304—giving a total of 1164 registers per lane. These sizes could be varied as long as the cache allocation for the L1 cache 320 remains a power of 2 and smaller than the tag array.

As previously explained, each bank of the memory bank(s) 405 may be accessed in one of three ways: as aligned (per lane), as unaligned (per SPM 310), or as uniform. A further variation is that a portion of the memory bank(s) 405 may be configured and accessed as a cache, e.g., the L1 cache 320. In one embodiment, access priority is given to accesses of the memory bank(s) configured as the local register file 304, so that operand fetch from the local register file 304 is completed with the lowest possible latency. For local register file 304 accesses, a per thread group base pointer is combined with the register number to produce an address. The low Ig(B) bits of the address select the bank and the high bits provide the offset into the bank. The compiler may schedule local register file 304 accesses so there are no bank conflicts.

For aligned accesses of the shared memory 306, each lane provides an index. The index is combined, e.g., added, to a base pointer by the unified memory access control 410 to produce an address. The address is interpreted identically to the address for an access of the local register file 304, i.e., the low Ig(B) bits select the bank, and the remaining bits provide an offset within that bank. L adjacent lanes must all access the same word of each bank. When multiple aligned accesses within an L-lane group access different words of the same bank, the aligned accesses are serialized. Reducing the number of lanes may reduce the number of access cycles over which the aligned accesses are serialized. Multiple aligned accesses to different banks or to the same word of the same bank may proceed in parallel. In the absence of conflicts, aligned accesses of the shared memory 306 have a cost and latency equal to that of a read access of the local register file 304. The compiler can schedule these to avoid over subscribing the total number of banks between aligned accesses and unaligned accesses, but the compiler cannot anticipate bank conflicts. Therefore, the unified memory access control 410 is configured to handle bank conflicts.

Unaligned accesses allow any lane of an SPM 310 to access any bank of the unified memory unit 400. An index specified by the access request is added to a base register for the logical shared memory 306 by the unified memory access control 410 to form an address that uses the low Ig(B) bits to select a bank, the next lg(G) bits to select a group of lanes, and the remaining bits to select an offset within that bank of that lane. To perform an unaligned access, the "group" bits of the address are used to route the remainder of the address to the required group. At the group, the unified memory access control 410 arbitrates between the requests when a bank conflict occurs. Once the unified memory access control 410 grants access for a request, the word is read from or written to the memory bank(s) 410.

Accesses of the logical L1 cache 320 proceed in the same manner as accesses for the logical shared memory 306 except that a tag array is checked at the destination group. If the high bits of the address "hit" in the tag array, the tag array identifies whether the requested line is present in the memory bank(s) 405 and which "set" contains the line. The number of tag arrays per SPM 310 and the number of sets are both parameters that can be configured.

Figure 5B:
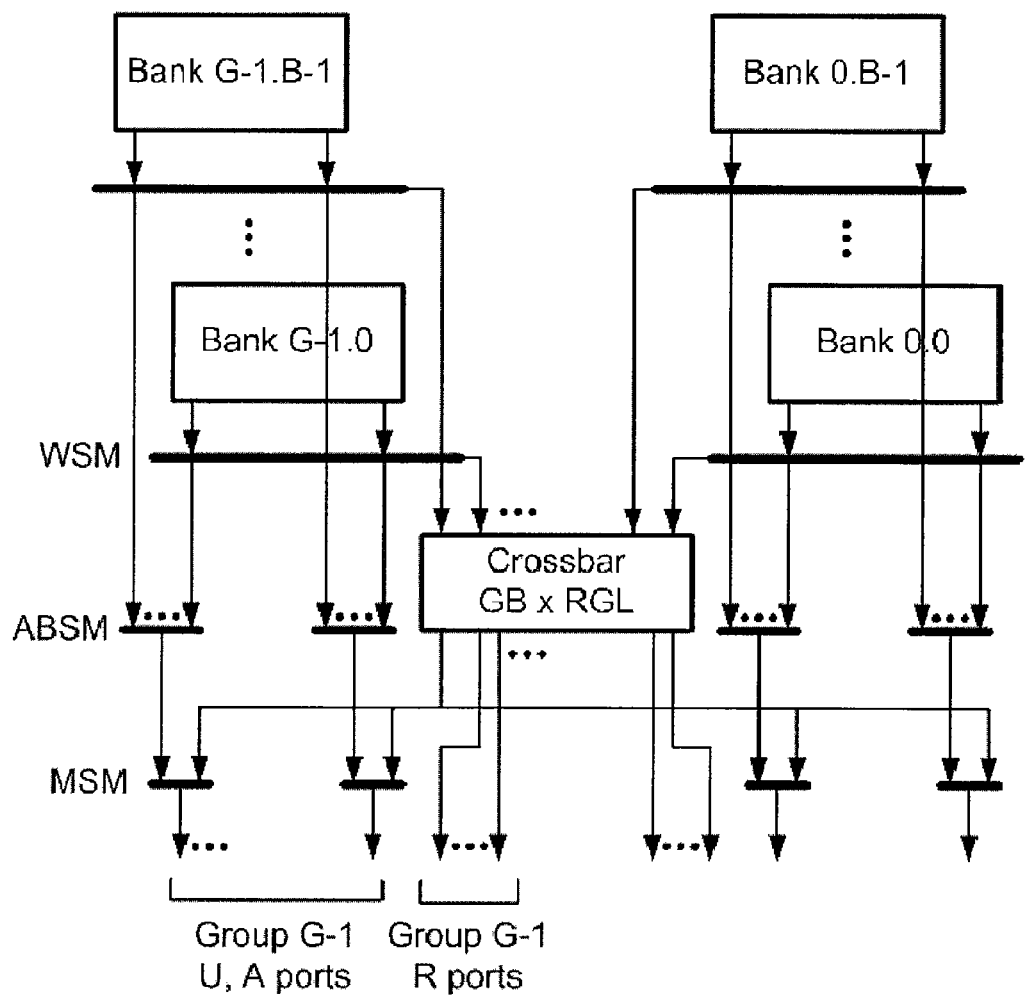
FIG. 5B is a block diagram illustrating the interconnections between the multiple memory banks of the unified memory unit, the multiplex unit, the crossbar interconnect, and the mode selection unit of FIG. 4B, according to one embodiment of the present invention.

FIG. 5B is a block diagram illustrating the interconnections between the multiple memory bank(s) 405 of the unified memory unit 400, the multiplex unit 415, the crossbar interconnect 420, and the mode selection unit 425 of FIG. 4B, according to one embodiment of the present invention. For aligned accesses, an aligned bank select multiplexer (ABSM) selects the appropriate bank for each of the P aligned ports in each lane. While only one multiplexer is shown in FIG. 5B, the ABSM is actually a B×P switch and is included with the multiplex unit 415 shown in FIG. 4B. A mode select multiplexer (MSM) which is shown in FIG. 4B as the mode selection unit 425 then selects between aligned and uniform access for each input port of the exec units 302. The crossbar (crossbar interconnect 420 of FIG. 4B) selects any word of any bank to feed the uniform access input port of the exec units 302. More than one uniform access word may be provided by the mode selection unit 425.

For unaligned (or random) accesses, a word select multiplexer (WSM) selects the appropriate word from each bank that is being accessed randomly. If L=1 then the WSM is not needed. The WSM is included within the multiplex unit 415 shown in FIG. 4B. A GB×RGL crossbar switch (crossbar interconnect 420 of FIG. 4B) routes the appropriate bank's word to each of the R random access input ports of the exec units 302 in each of the GL lanes. One output port of the GB×RGL crossbar switch is used to select the source for uniform access. More than one uniform port may be provided if needed. The write path is the reverse of the read path. A multiplexer at the write port of each bank (included within the crossbar interconnect 430 of FIG. 4B) selects between an aligned write path and a random write path.

For each access request the unified memory access control 410 determines an address and configures the multiplex unit 415, crossbar interconnects 420 and 430, and the mode selection unit 425. For aligned accesses, such as accesses of the local register file 304, the address is derived from a register specifier field of the instruction and the register base address for the corresponding thread. For aligned accesses to other portions of the unified memory unit 400, the address is provided by the address port of a LSU 303. For accesses of the L1 cache 310 the address may also provided by the address port of the LSUs 303. Arbitration logic within the unified memory access control 410 may select the address source for each bank. Table 1 shows the address generation for aligned and random access modes, where b is the number of banks, l is the number of lanes, g is the number of groups, and n is the number of bits in the address.

TABLE 1

| Use Case | Offset | Bank | Group | Lane |
|---|---|---|---|---|
| Aligned | A[n + b − 1:b] | A[b − 1:0] | Fixed | Fixed |
| Random | A[n + b + g + l − 1:b + g + l] | A[b + g + l − 1:g + l] | A[g + l − 1:l] | A[l − 1:0] |

Table 1 shows that the aligned and random access modes form addresses differently. The aligned mode uses the lane number to form the low (lane and group) portion of the address. The actual address specifies the bank and offset within the bank. For random access, the low bits of the address select the lane and group.

Accesses of the L1 cache 320 require access to a tag array before accessing one of the memory banks. For aligned cache accesses there is an aligned tag array per group. For unaligned cache accesses T tag arrays with GL/T lanes share each array. Within each GL/T-lane tag partition, one address is selected by the unified memory access control 410 to access the tag array. The tag array may be included within the unified memory access control 410. The index and tag fields of the address are used to access the tag array to detect a hit and a way. Other addresses within the partition having identical index and tag fields share this access. Other addresses in the partition that do not match an index or tag must wait to access to the tag array. Note that if T=L the number of aligned and unaligned tag arrays is the same and can be shared. A separate tag array may be provided for accessing the uniform L1 cache 375.

The unified memory access control 410 is also configured to arbitrate between accesses to the tag array. Tag array accesses with variable indices cannot be deconflicted at compile time, thereby necessitating arbitration at execution time. Additionally, accessing the memory bank(s) 405 as a cache introduces the issue of coherence. The data associated with an address cached for a particular lane may become stale if the same address is written in another lane. A mechanism, hardware or software, is needed to ensure that coherence is maintained.

To simplify instruction issue, accesses to the local register file 304 are given highest priority. Note that accesses of the local register file 304 within an instruction are already deconflicted by the compiler. Aligned and unaligned accesses of other logical memories are first masked by accesses of the local register file 304 and then compete among themselves for access to each memory bank. The arbitration grant signals generated by the unified memory access control 410 may be used to directly control one-hot-select address multiplexers to select the address applied to each bank of the memory banks(s) 405.

The per-thread datapath provided by each unified memory unit 400 includes a number of functional units within an exec unit 302, a set of operand registers, and logical memories configured within the memory bank(s) 405. The operand registers and the banks configured as the logical register file 304 may be aligned to a particular exec unit 302 input port. The crossbar interconnect 430 may include a small amount of buffering along with routing to connect the exec unit 302 output ports to all bank inputs or the logical local register file 304.

To facilitate the move operations that are required with a partitioned register organization, each exec unit 302 is configurable to perform a move in parallel with any operation that does not use all of the input ports of an exec unit 302. The different functional units within the exec unit 302 have different latencies, so the results are written back to the different logical memories within the memory-bank(s) 405 asynchronously. Table 2 shows the cycle-by-cycle operations for the different accesses.

TABLE 2

| Case | Local Register File Access | Aligned Access | Aligned Cache Access | Unaligned Access | Unaligned Cache Access |
|---|---|---|---|---|---|
| Cycle 0 | Form address | Form address | Form address | Form address | Form address |
| Cycle 1 | Arbitrate (always wins) | Arbitrate | Access tags Arbitrate | Arbitrate | Select addr |
| Cycle 2 | Read array | Read array | Read array | Read array | Access tags Compare unselected Arbitrate |
| Cycle 3 | | | | Traverse the crossbar interconnect | Read array |
| Cycle 4 | | | | | Traverse the crossbar interconnect |

Table 2 shows pipeline timing for different read access modes. Cycle 0 in each of these modes produces the address for the access and is not part of the access itself. Arbitration is performed one cycle before the arrays are accessed. Address multiplexing happens in the same cycle as arbitration. Unaligned accesses require a cycle to traverse the crossbar interconnect 420. In other embodiments, the different operations may require fewer or more cycles.

Figure 6:
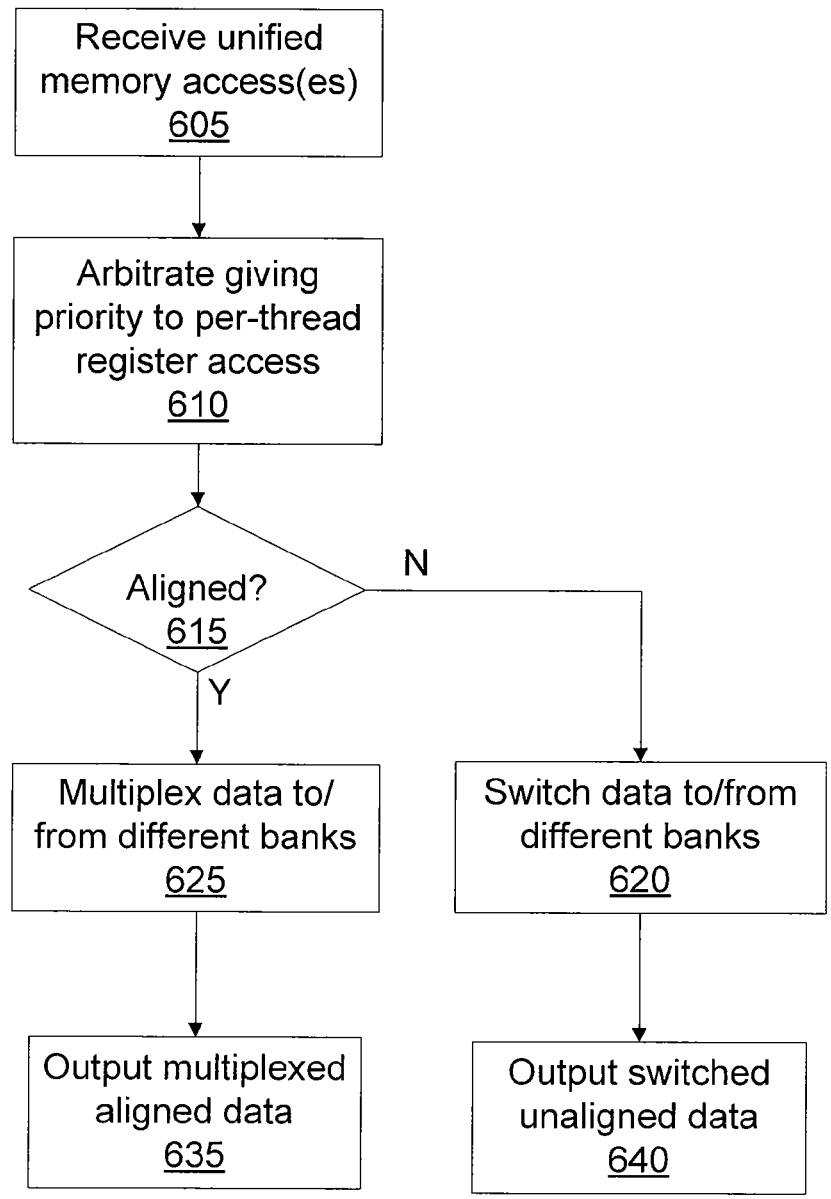
FIG. 6 is a flow diagram of method steps for accessing the unified memory, according to one embodiment of the present invention.

FIG. 6 is a flow diagram of method steps for accessing the memory bank(s) 405 within the unified memory unit 400, according to one embodiment of the present invention. Although the method steps are described in conjunction with the systems of FIGS. 1, 2, 3A, 3B, 3C, 4A, 4B, 5A, and 5B persons skilled in the art will understand that any system configured to perform the method steps, in any order, is within the scope of the inventions. At step 605 the unified memory access control 410 receives at least one access require for the unified memory. At step 610, the unified memory access control 410 arbitrates between the requests when multiple requests are received. The arbitration may be for access to the tag array when two or more requests access a logical cache embodied within the memory bank(s) 405.

At step 615 the unified memory access control 410 determines if the request is for an aligned access, and, if so, then at step 625 the unified memory access control 410 configures the multiplex unit 415 to direct the data read from the memory bank(s) 405 to mode selection unit 425 for a read access. When the access is a write access, the unified memory access control 410 configures the crossbar interconnect 430 to direct the output port(s) of the exec units 302 to the memory bank(s) 405. At step 635 the unified memory access control 410 configures the mode selection unit 425 to direct the multiplexed aligned data to the input ports of the exec units 302 for a read access.

If, at step 615 the unified memory access control 410 determines that the request is not for an aligned access, then at step 620 the unified memory access control 410 configures the multiplex unit 415 and the crossbar interconnect 420 to direct the data read from the memory bank(s) 405 to the mode selection unit 425 for a read access. When the access is a write access, the unified memory access control 410 configures the crossbar interconnect 430 to direct the output port(s) of the exec units 302 to the memory bank(s) 405. At step 640 the unified memory access control 410 configures the mode selection unit 425 to direct the switched unaligned data to the input ports of the exec units 302 for a read access.

The primary advantage of combining all classes of storage, e.g., local registers, caches, shared memory, and cached uniform values, into a single unified memory system is that both capacity and bandwidth may be shared between the different classes—so that a resource not used by one class of storage may be exploited by a different class. An application that needs more local registers and less shared memory (or vice versa) can dynamically transfer storage between the two classes. Similarly, unused local register bandwidth may be exploited by the other classes, such as the cached storage. An additional advantage is that increasing the number of memory banks is likely to reduce the number of bank conflicts for unaligned accesses. Finally, the unified memory unit 400 supports both aligned and unaligned accesses. The aligned accesses have lower latency, and potentially higher bandwidth, compared with the unaligned accesses because the crossbar interconnect 420 is not traversed for the aligned accesses.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for accessing a unified memory, the method comprising:
   arbitrating access requests for the unified memory, wherein the unified memory is configured for aligned access requests and unaligned access requests;
   multiplexing data from different banks of the unified memory to process the aligned access requests; and
   switching data from different banks of the unified memory to process the unaligned access requests, wherein different portions of the unified memory are allocated for different logical memories and the different logical memories include constant registers.

2. The method of claim 1, wherein the different logical memories include per-thread registers.

3. The method of claim 2, wherein the arbitrating comprises selecting access requests for the per-thread registers over access requests for other logical memories.

4. The method of claim 2, wherein access requests for the per-thread registers are aligned.

5. The method of claim 1, wherein the different logical memories include a cache.

6. The method of claim 5, further comprising accessing a tag array to detect a hit and a way for each matching index and tag field for at least one access request of the access requests.

7. The method of claim 1, wherein the different logical memories include shared memory that is shared between multiple threads.

8. The method of claim 7, wherein access requests for the shared memory are unaligned.

9. A non-transitory computer-readable storage medium storing instructions that, when executed by a processor, cause the processor to access a unified memory, by performing the steps of:

arbitrating access requests for the unified memory, wherein the unified memory is configured for aligned access requests and unaligned access requests;

multiplexing data from different banks of the unified memory to process the aligned access requests; and switching data from different banks of the unified memory to process the unaligned access requests, wherein different portions of the unified memory are allocated for different logical memories and the different logical memories include constant registers.

10. A system for accessing a unified memory, the system comprising:

banks of memory configured to store data for the unified memory;

a multiplex unit configured to direct the data for aligned and unaligned access requests;

a crossbar interconnect coupled to the multiplex unit and the banks of memory and configured to direct the data for unaligned access requests by switching the data between different banks of the banks of memory;

a mode selection unit coupled between the multiplex unit and the crossbar interconnect and input ports of multiple execution units; and a unified memory access control coupled to the at least one memory bank, the multiplex unit, the crossbar interconnect, and the mode selection unit and configured to arbitrate access requests for the unified memory and configure the multiplex unit, the crossbar interconnect, and the mode selection unit for aligned access requests and unaligned access requests.

11. The system of claim 10, wherein different portions of the banks of memory are allocated for different logical memories.

12. The system of claim 11, wherein the different logical memories include per-thread registers.

13. The system of claim 12, wherein the unified memory access control is further configured to select access requests for the per-thread registers over access requests for other logical memories during arbitration.

14. The system of claim 11, wherein the different logical memories include a cache.

15. The system of claim 14, wherein the unified memory access control is further configured to access a tag array to detect a hit and a way for each matching index and tag field for at least one access request of the access requests.

16. The system of claim 12, wherein access requests for the per-thread registers are aligned.

17. The system of claim 11, wherein the different logical memories include shared memory that is shared between multiple threads.

18. The system of claim 17, wherein access requests for the shared memory are unaligned.

* * * * *